(12) United States Patent
Tanabe et al.

(10) Patent No.: US 6,594,089 B2
(45) Date of Patent: Jul. 15, 2003

(54) PROJECTION LENS SHIFTING MECHANISM AND REAR PROJECTION TELEVISION

(75) Inventors: Kazunori Tanabe, Okayama (JP); Keiji Uchida, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/920,108

(22) Filed: Aug. 1, 2001

(65) Prior Publication Data

US 2002/0067552 A1 Jun. 6, 2002

(30) Foreign Application Priority Data

Aug. 3, 2000 (JP) ........................................ 2000-236215

(51) Int. Cl.[7] .............................................. G02B 15/14
(52) U.S. Cl. ........................ 359/703; 359/649; 359/699; 359/704; 359/823; 353/31; 353/119; 349/7
(58) Field of Search ................................. 359/649, 650, 359/651, 696, 699, 700, 701, 703, 704, 823; 353/31, 34, 37, 101, 102, 119; 349/7, 8

(56) References Cited

U.S. PATENT DOCUMENTS

| | | | |
|---|---|---|---|
| 5,349,476 A | * 9/1994 | Burnham et al. | ........... 359/699 |
| 5,836,664 A | 11/1998 | Conner et al. | ................ 353/70 |
| 5,868,485 A | * 2/1999 | Fujimori et al. | ............ 353/119 |
| 5,895,110 A | 4/1999 | Okada et al. | ................. 353/31 |
| 6,097,546 A | 8/2000 | Yoshii et al. | ................ 359/649 |
| 6,324,019 B1 | * 11/2001 | Takanashi et al. | .......... 359/704 |

FOREIGN PATENT DOCUMENTS

| | | |
|---|---|---|
| JP | 04-346309 | 12/1992 |
| JP | 06-331953 | 12/1994 |
| JP | 10-319499 | 12/1998 |
| JP | 2000-333103 | 11/2000 |

* cited by examiner

Primary Examiner—Loha Ben
(74) Attorney, Agent, or Firm—RatnerPrestia

(57) ABSTRACT

A projection lens shifting mechanism comprises a projection lens unit in the shape of a cylinder for projecting incoming image light, a flange integrated with the projection lens unit, a projection lens mount for providing light emitted from a light valve in the shape of a plane to the projection lens unit, wherein the light valve can be optically modulated for each pixel based on image information, and the projection lens mount is concentric to an optical axis of the light emitted from the light valve, a first cam follower provided in the flange along an optical axis of the projection lens unit, a cam follower guiding portion provided in the projection lens mount for guiding the first cam follower in a direction perpendicular to the optical axis of the projection lens unit, a first lens shifting cam capable of being moved in a predetermined direction with respect to the projection lens mount and engaged with the first cam follower, for shifting the first cam follower in a direction guided by the cam follower guiding portion when the first lens shifting cam is moved in the predetermined direction, and a fixing section for integrating and fixing the first lens shifting cam and the flange to the projection lens mount.

14 Claims, 7 Drawing Sheets

PROJECTION LENS SHIFTING MECHANISM AND REAR PROJECTION TELEVISION

BACKGROUND OF THE INVENTION

1. Field of the Invention

The present invention relates to a projection lens shifting mechanism for shifting a projection lens unit in a predetermined direction, which is used in a projection display apparatus such as a liquid crystal rear projection television, and in which a light source emits a light flux to illuminate a light valve, such as a liquid crystal panel, an image is produced by the light transmitted or reflected by the light valve, the image is enlarged by a cylinder-shaped projection lens unit to be projected onto a transmission type screen. More specifically, the present invention relates to a projection lens shifting mechanism capable of adjusting the position of an image projected on a screen by translating an optical axis of a projection lens unit, and a rear projection television using the same.

2. Description of the Related Art

In recent projection display apparatuses, such as rear projection televisions, an assembly of a panel-shaped light valve including a transmission or reflection type liquid crystal panel, and a high-intensity lamp such as a metal halide lamp and an extra-high pressure mercury lamp is used instead of a CRT so as to obtain high intensity and high resolution.

The position of an image is adjusted by electrical control in CRTs. Such an adjusting technique is not easily adopted in rear projection televisions using a panel-shaped light valve. Therefore, the attaching position of an optical unit including a light valve, a projection lens unit, a lamp, and the like are adjusted so as to fit the position of an image to be projected on a screen.

However, in rear projection televisions, an optical unit including optical elements (e.g., a light valve, a projection lens unit, a lamp, and optical elements included in an illumination optical system for illuminating the light valve with high efficiency) needs to be accurately positioned and fixed in order to adjust the position of an image to be projected on a screen with high precision. To position and fix an optical unit accurately requires highly rigid and large-size parts which constitute a mechanism for shifting and positioning the optical unit. Therefore, the weight and manufacturing cost of rear projection televisions are likely to be increased.

SUMMARY OF THE INVENTION

According to one aspect of the present invention, a projection lens shifting mechanism comprises a projection lens unit in the shape of a cylinder for projecting incoming image light, a flange integrated with the projection lens unit, a projection lens mount for providing light emitted from a light valve in the shape of a plane to the projection lens unit, wherein the light valve can be optically modulated for each pixel based on image information, and the projection lens mount is concentric to an optical axis of the light emitted from the light valve, a first cam follower provided in the flange along an optical axis of the projection lens unit, a cam follower guiding portion provided in the projection lens mount for guiding the first cam follower in a direction perpendicular to the optical axis of the projection lens unit, a first lens shifting cam capable of being moved in a predetermined direction with respect to the projection lens mount and engaged with the first cam follower, for shifting the first cam follower in a direction guided by the cam follower guiding portion when the first lens shifting cam is moved in the predetermined direction, and a fixing section for integrating and fixing the first lens shifting cam and the flange to the projection lens mount.

In one embodiment of this invention, the first lens shifting cam is in the shape of a ring, and is attached to the projection lens mount in such a manner as to be capable of being rotated around light emitted from the light valve.

In one embodiment of this invention, the first lens shifting cam includes a cam hole extending in a direction tilted with respect to a circumferential direction of the first lens shifting cam, and the first cam follower is engaged with the cam hole.

In one embodiment of this invention, the first lens cam is provided between the flange and the projection lens mount, and the fixing section includes a screw and a nut to integrate the flange with the projection lens mount.

In one embodiment of this invention, the screw is provided with a compression spring so that the flange is biased toward the projection lens mount.

In one embodiment of this invention, the flange includes a second cam follower provided about ¼ of a perimeter in a circumferential direction of the flange away from the first cam follower and along an optical axis of the projection lens unit. The second lens shifting cam engaged with the second cam follower is attached to the projection lens mount in such a manner as to be capable of being moved in a predetermined direction. The second cam follower is moved in a direction substantially perpendicular to the cam follower guiding portion when the second lens shifting cam is moved in the predetermined direction with respect to the projection lens mount.

In one embodiment of this invention, the second lens shifting cam is in the shape of a ring, and is attached to the projection lens mount in such a manner as to be capable of being rotated around light emitted from the light valve.

In one embodiment of this invention, the second lens shifting cam includes a cam hole extending in a direction tilted with respect to a circumferential direction of the second lens shifting cam, and the second cam follower is engaged with the cam hole.

In one embodiment of this invention, the second lens shifting cam and the flange are integrated and fixed to the projection lens mount by the fixing section.

In one embodiment of this invention, the light valve is of a transmission type where light is transmitted through the light valve, or of a reflection type where light is reflected by the light valve.

According to another aspect of the present invention, a projection lens shifting mechanism comprises a projection lens unit in the shape of a cylinder for projecting incoming image light, a flange integrated with the projection lens unit, a projection lens mount for providing light emitted from a light valve in the shape of a plane to the projection lens unit, wherein the light valve can be optically modulated for each pixel based on image information, and the projection lens mount is concentric to an optical axis of the light emitted from the light valve, a first cam follower provided in the projection lens mount along an optical axis of the projection lens unit, a cam follower guiding portion provided in the flange for guiding the first cam follower in a direction perpendicular to the optical axis of the projection lens unit, a first lens shifting cam capable of being moved in a predetermined direction with respect to the projection lens mount and engaged with the first cam follower, for shifting the first cam follower in a direction guided by the cam follower guiding portion when the first lens shifting cam is moved in the predetermined direction, and a fixing section for integrating and fixing the first lens shifting cam and the flange to the projection lens mount.

In one embodiment of this invention; the flange includes a second cam follower provided about ¼ of a perimeter in a circumferential direction of the flange away from the first cam follower and along an optical axis of the projection lens unit. The second lens shifting cam engaged with the second cam follower is attached to the projection lens mount in such a manner as to be capable of being moved in a predetermined direction. The second cam follower is moved in a direction substantially perpendicular to the cam follower guiding portion when the second lens shifting cam is moved in the predetermined direction with respect to the projection lens mount.

According to another aspect of the present invention, a rear projection television comprises the projection lens shifting mechanism of the present invention.

Thus, the invention described herein makes possible the advantages of providing a projection lens shifting mechanism capable of adjusting the position of a projection lens unit included in an optical unit with high precision, i.e., capable of adjusting the position of an image to be projected on a screen with high precision.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
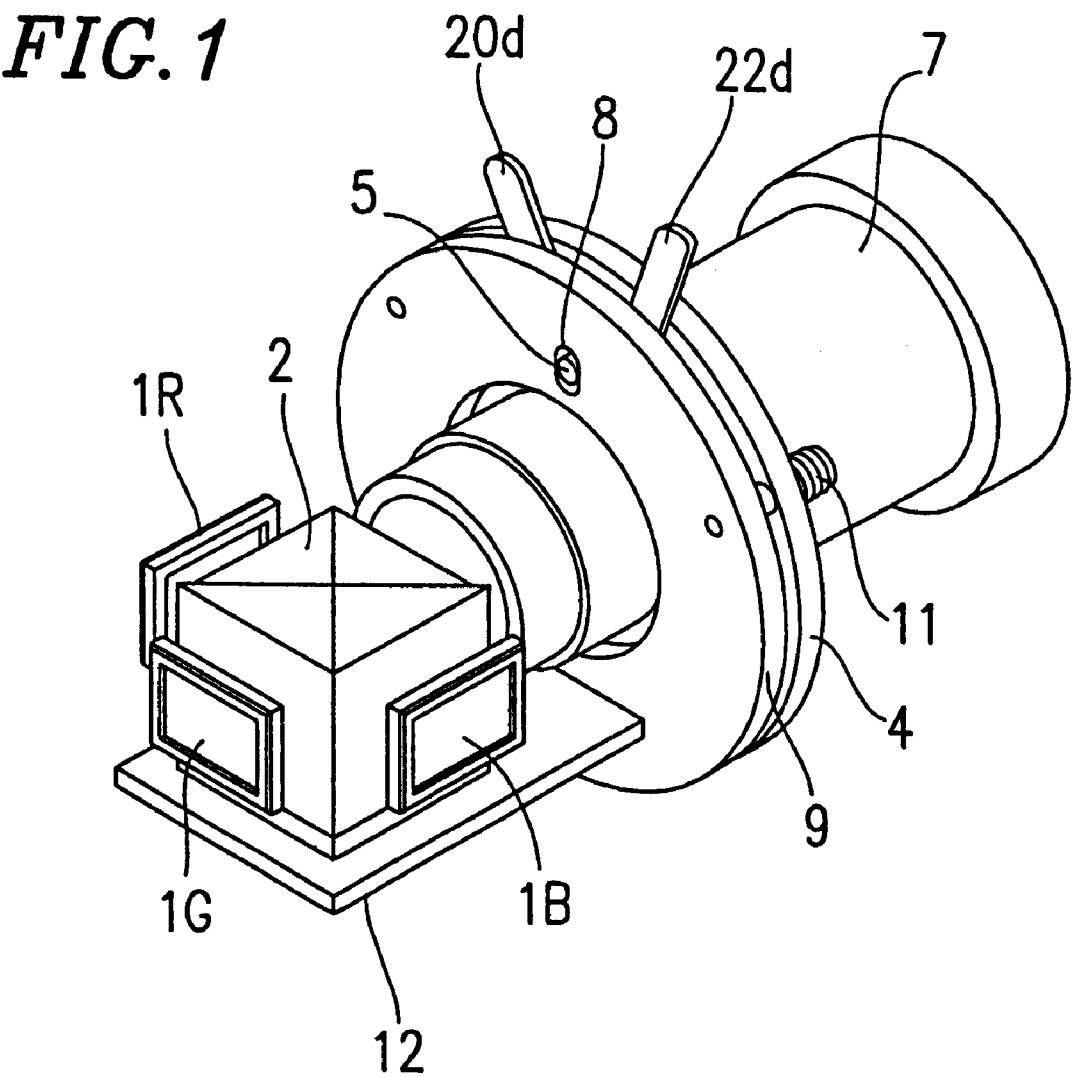
FIG. 1 is a perspective view showing an exemplary optical unit including a lens shifting mechanism according to the present invention.
Figure 2:
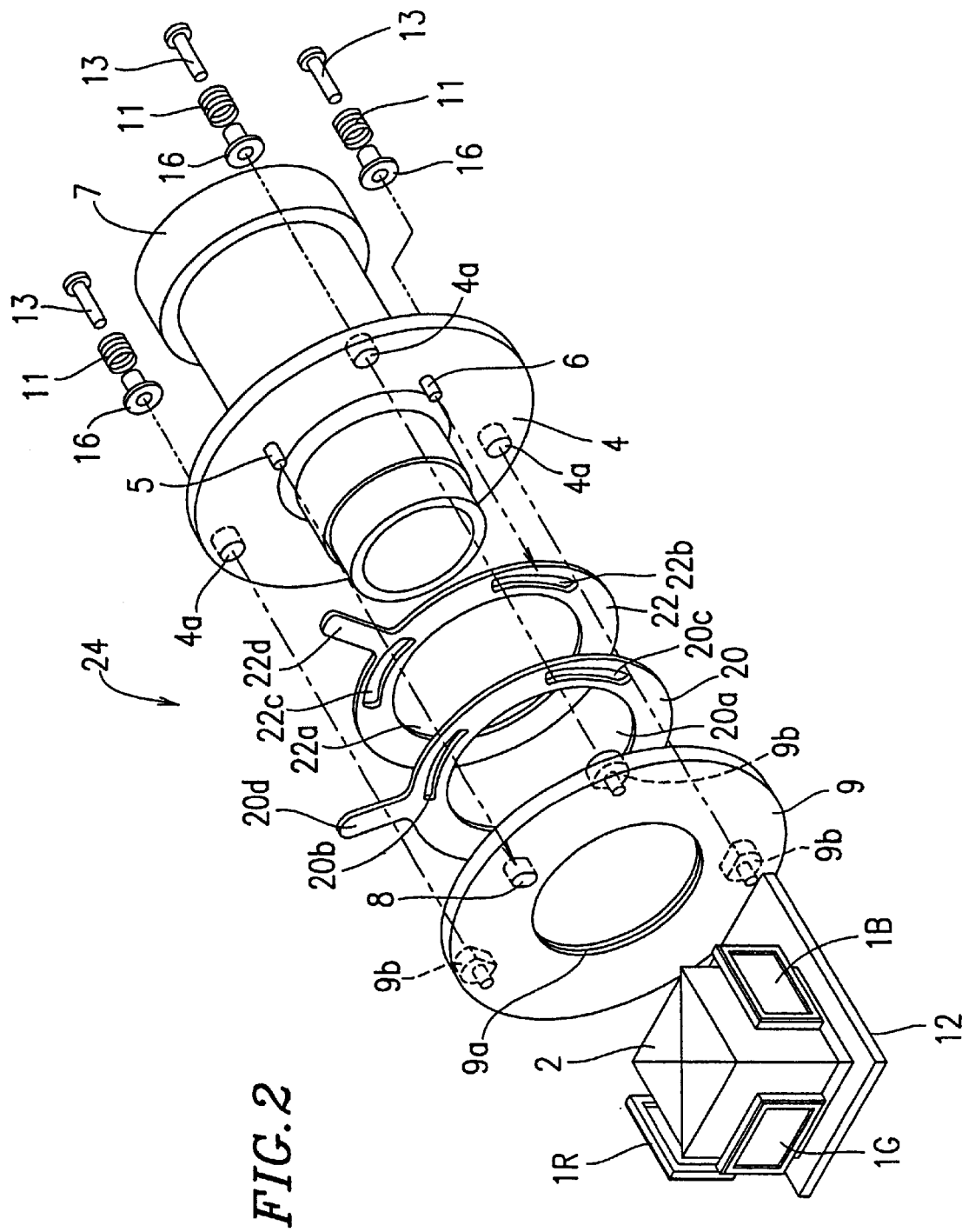
FIG. 2 is an exploded perspective view of the optical unit of FIG. 1.
Figure 3:
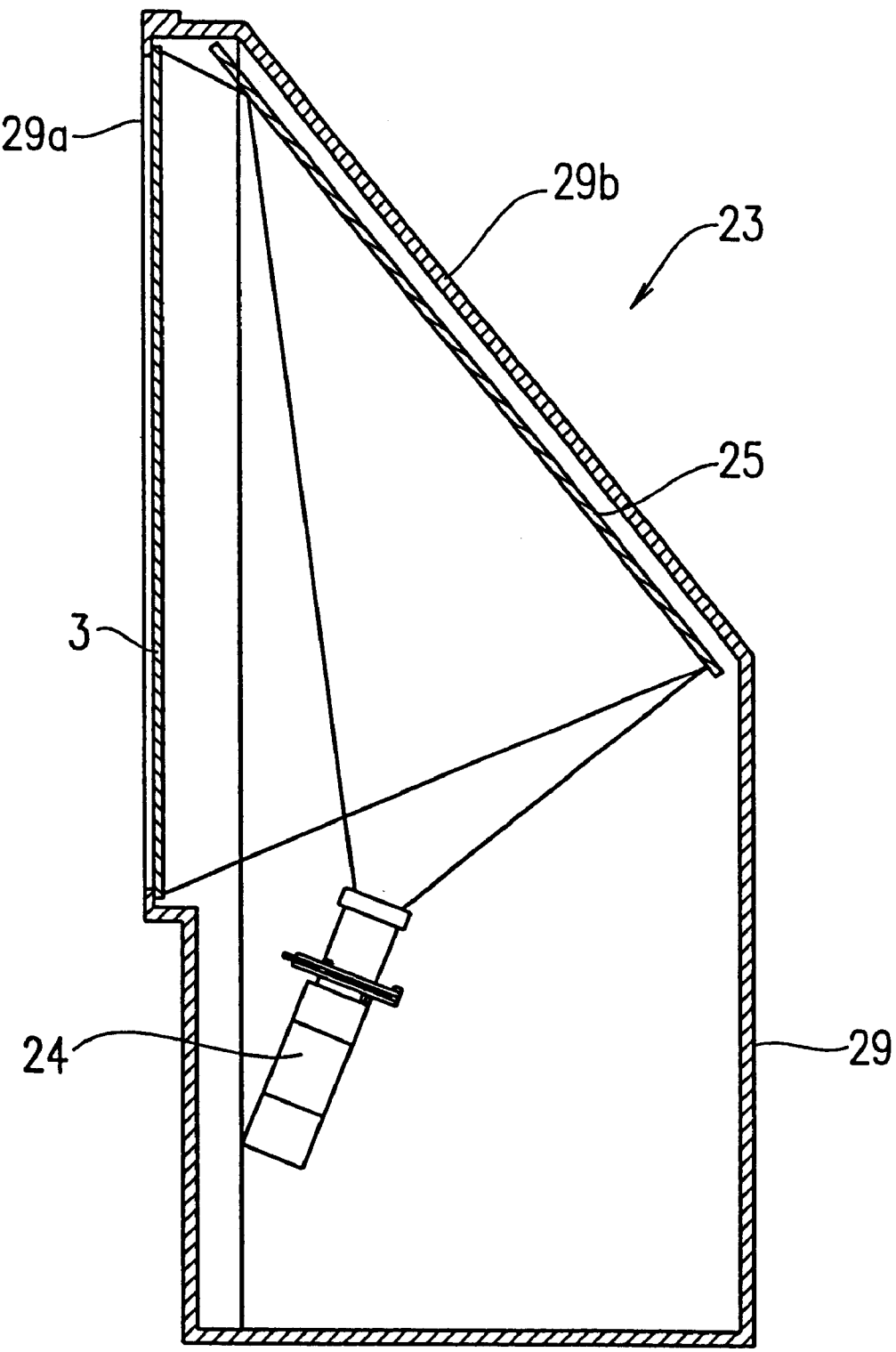
FIG. 3 is a cross-sectional view showing a schematic configuration of a rear projection television including the optical unit of FIG. 1.

FIG. 1 is a perspective view showing an exemplary optical unit including a lens shifting mechanism according to the present invention. FIG. 2 is an exploded perspective view of the optical unit of FIG. 1. A lens shifting mechanism 24 is provided in a rear projection television (hereinafter also referred to as a rear PTV) which is a transmission type display apparatus. FIG. 3 is a cross-sectional view showing a schematic configuration of the rear PTV.

Referring to FIG. 3, a rear PTV 23 includes a cabinet 29 for housing an optical unit 24 including the lens shifting mechanism of the present invention. The cabinet 29 includes a rectangular opening 29a which is provided at an upper portion of a vertical front side of the cabinet 29. The opening 29a is covered with a screen 3. A mirror 25 is provided at a rear of the screen 3 and on an upper side 29b of the cabinet 29. The mirror 25 is tilted with respect to the screen 3. The optical unit 24 including the lens shifting mechanism of the present invention is provided below the screen 3 and in the cabinet 29. An image produced by light emitted from the optical unit 24 is reflected by the tilted mirror 25 and projected onto the screen 3.

Referring to FIGS. 1 and 2, the optical unit 24 including the lens shifting mechanism of the present invention has a cylinder-shaped projection lens unit 7 and a ring-shaped projection lens mount 9 which is integrated into the projection lens unit 7.

A ring-shaped flange 4 is integrated to the cylinder-shaped projection lens unit 7. The flange 4 is provided in the vicinity of an end of the projection lens unit 7 through which light enters. The flange 4 protrudes outward all around the projection lens unit 7 and is perpendicular to the optical axis of the projection lens unit 7.

A circular opening 9a to be inserted into the projection lens unit 7 is provided at a middle of the projection lens mount 9. The light-incoming end of the projection lens unit 7 is inserted into the opening 9a in such a manner that the optical axis of the projection lens unit 7 substantially passes through the center of the opening 9a. The light-incoming end of the flange 4 of the projection lens unit 7 is inserted in the opening 9a so that the flange 4 is joined to the projection lens mount 9.

A base 12 is attached at a lower portion of the projection lens mount 9 and along the light-incoming end of the projection lens unit 7. A color synthesizing prism 2 is provided on the base 12. Light emitted from the color synthesizing prism 2 enters the projection lens unit 7. The color synthesizing prism 2 has a cross-section in the shape of a right-angled triangle where a pair of sides are joined perpendicularly. One of the sides perpendicularly joined is opposed to the light-incoming end of the projection lens unit 7. The other side is parallel to the optical axis of the projection lens unit 7. A dichroic mirror is provided in the color synthesizing prism 2. A reflection surface of the dichroic mirror is tilted at an angle of 45 degrees with respect to the optical axis of the projection lens unit 7.

Three liquid crystal panels 1R, 1G, and 1B which are light valves are provided on the base 12. The liquid crystal panels 1R, 1G, and 1B are illuminated with R(red), G(green), and B(blue) light, respectively. Red light, green light, and blue light are obtained by splitting white light emitted from a light source by a color splitting optical system. The liquid crystal panels 1R, 1G, and 1B each modulate illuminating light for each pixel based on image information.

The liquid crystal panel 1R illuminated with red light (R) is provided on a side of the color synthesizing prism 2 which is parallel to the optical axis of the projection lens unit 7. The liquid crystal panel 1B illuminated with blue light (B) is provided on an opposite side of the color synthesizing prism 2 to the liquid crystal panel 1R. The liquid crystal panel 1G illuminated wit) green light (G) is provided on a side of the color synthesizing prism 2 opposite to the light-incoming end of the projection lens unit 7. Red light (R), green light (G), and blue light (B), which have passed through the respective liquid crystal panels 1R, 1G, and 1B, are synthesized by the color synthesizing prism 2 to produce image light which in turn illuminates the projection lens unit 7.

The color synthesizing prism 2 is fixed on the base 12. The base 12 is integrated to the projection lens mount 9. In this case, the color synthesizing prism 2 is registered with the projection lens mount 9 in such a manner that the optical axis of image light emitted from the color synthesizing prism 2 is identical to the center axis of the opening 9a of the projection lens mount 9.

A first lens shifting cam 20 and a second lens shifting cam 22 are fitted to the projection lens unit 7, between the projection lens mount 9 and the flange 4 of the projection lens unit 7, in this order from the projection lens mount 9. The first and second lens shifting cams 20 and 22 are in the shape of a similar ring, and have concentric circular openings 20a and 22a in the middle thereof, respectively. The outside diameters of the first and second lens shifting cams 20 and 22 are slightly smaller than those of the flange 4 and the projection lens mount 9. The projection lens mount 9 is inserted into the openings 20a and 22a of the first and second lens shifting cams 20 and 22. The first and second lens shifting cams 20 and 22 can be rotated with respect to the projection lens mount 9.

Figure 4:
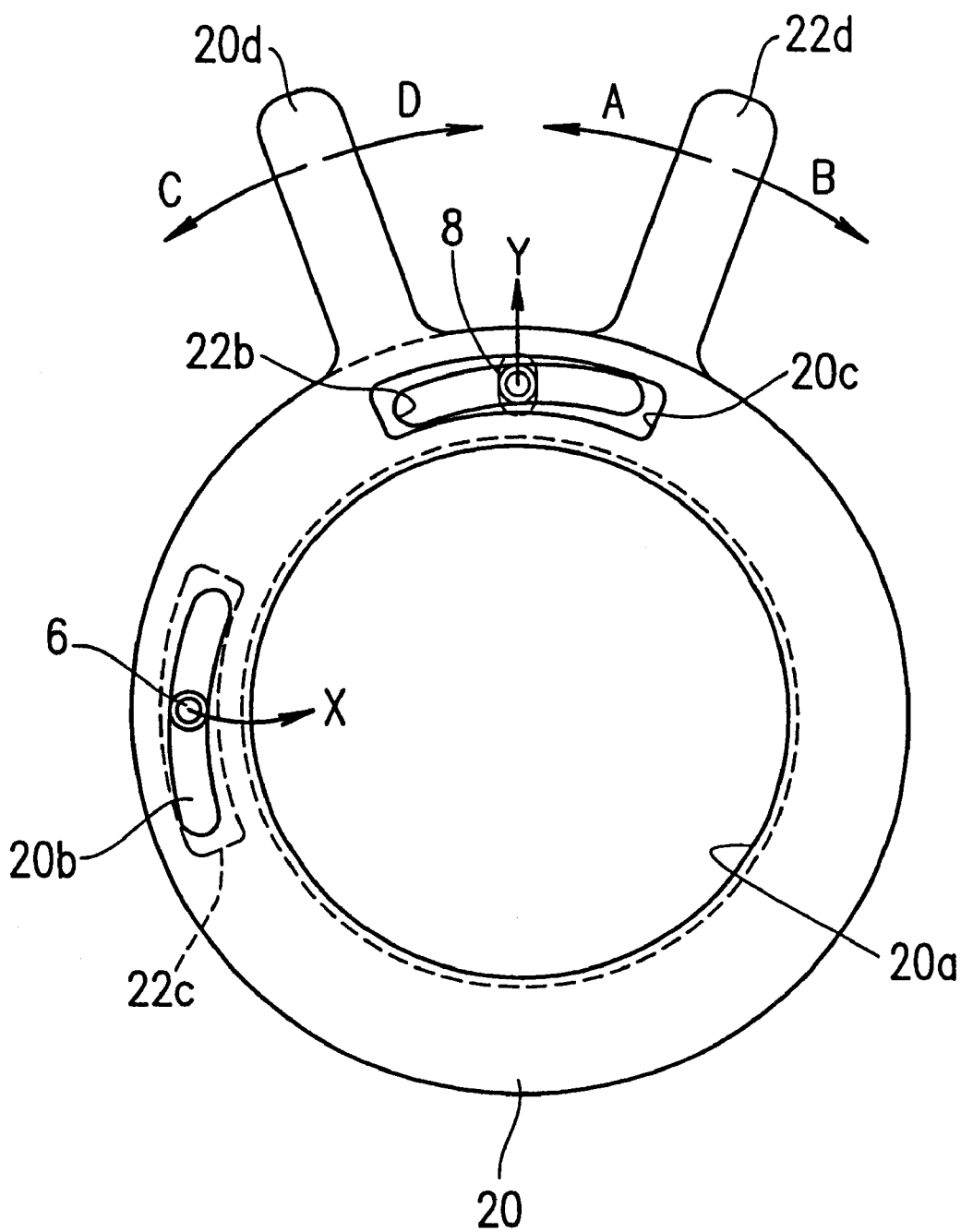
FIG. 4 is a front view of main parts of the optical unit of FIG. 1.

FIG. 4 is a front view of the second lens shifting cam 22 and the first lens shifting cam 20 viewed from the color synthesizing prism 2 side which is the light illuminating side of the projection lens unit 7. A first cam hole 20b which is a long hole having about ⅛ of the perimeter of the first lens shifting cam 20 is provided in the first lens shifting cam 20. The first cam hole 20b is tilted with respect to the circumferential direction of the first lens shifting cam 20. The first cam hole 20b has substantially the same width over the substantially entire lengthwise direction. One end of the first cam hole 20b which is positioned in a direction indicated by an arrow A is positioned at the center side of the first lens shifting cam 20. The other end of the first cam hole 20b is positioned at the peripheral side of the first lens shifting cam 20. Thus, the first cam hole 20b is tilted with respect to the circumferential direction of the first lens shifting cam 20. The lengthwise direction of the first cam hole 20b substantially corresponds to the horizontal direction of an image produced on the screen 3 when image light is projected onto the screen 3 by the projection lens unit 7.

The first lens shifting cam 20 further includes a first cam follower guiding hole 20a in the circumferential direction thereof, which is a long hole having about ⅛ of the perimeter of the first lens shifting cam 20. The first cam follower guiding hole 20c is positioned ¼ of the perimeter away from the first cam hole 20b. Therefore, the lengthwise direction of the first cam follower guiding hole 20a substantially corresponds to the vertical direction of an image produced on the screen 3 when image light is projected onto the screen 3 by the projection lens unit 7. The first cam follower guiding hole 20c has substantially the same width over the substantially entire lengthwise direction. The width of the first cam follower guiding hole 20c is greater than the width of the first cam hole 20b. The first cam follower guiding hole 20c is provided in the circumferential direction of the first lens shifting cam 20.

The second lens shifting cam 22 includes a second cam follower guiding hole 22c opposed to the first cam hole 20b provided in the first lens shifting cam 20. The second cam follower guiding hole 22a is provided in the circumferential direction of the second lens shifting cam 22. The center of the second cam follower guiding hole 22c is substantially identical to the center of the first cam hole 20b. The whole first cam hole 20b provided in the first lens shifting cam 20 is positioned within the second cam follower guiding hole 22c. Specifically, the length of the second cam follower guiding hole 22c is longer than the length of the first cam hole 20b, while the width of the second cam follower guiding hole 22c is longer than the width of the first cam hole 20b.

The second lens shifting cam 22 further includes a second cam hole 22b opposed to the first cam follower guiding hole 20a provided in the first lens shifting cam 20. The width and length of the second cam hole 22b are similar to those of the first cam hole 20c and therefore, is tilted with respect to the circumferential direction of the second lens shifting cam 22. Specifically, one end of the second cam hole 22b close to the second cam follower guiding hole 22c is positioned at the center side of the second lens shifting cam 22, while the other end is positioned at the peripheral side of the second lens shifting cam 22. In this manner, the second cam hole 22b is tilted with respect to the circumferential direction of the second lens shifting cam 22.

The first lens shifting cam 20 further includes an operation portion 20d protruding radially outward from a position corresponding to one end of the first cam hole 20b (the distal end with respect to the first cam follower guiding hole 20a). The second lens shifting cam 22 further includes an operation portion 22d protruding radially outward from a position corresponding to one end of the second cam follower guiding hole 22c (the proximal end with respect to the second cam hole 22b).

The flange 4 integrated to the projection lens unit 7 includes a first cam follower 5 (FIG. 2) which is inserted into the first cam hole 20b of the first lens shifting cam 20. The first cam follower 5 is in the form of a pin protruding toward the projection lens mount 9 and along the optical axis of the projection lens unit 7. The first cam follower 5 has a diameter which is substantially equal to the width of the first cam hole 20b. The first cam follower 5 is inserted into the first cam hole 20b of the first lens shifting cam 20 and penetrates through the second cam follower guiding hole 22c of the second lens shifting cam 22 which surrounds the first cam hole 20b.

The projection lens mount 9 includes a cam follower guiding hole 8 into which the first cam follower 5 is inserted (FIG. 2). The cam follower guiding hole 8 is in the shape of a long hole whose lengthwise direction is a vertical direction (upward and downward) with respect to images which are projected onto the screen 3 (FIG. 1) by the projection lens unit 7. The first cam follower 5 inserted in the cam follower guiding hole 8 is guided in the lengthwise direction of the cam follower guiding hole 8. Therefore, first cam follower 5 inserted in the cam follower guiding hole 8 is guided in a radial direction of the projection lens mount 9.

The flange 4 of the projection lens unit 7 further includes a second cam follower 6 provided at a distance ¼ of the perimeter of the flange 4 in the circumferential direction thereof away from the first cam follower 5. The second cam follower 6 is in the form of a pin protruding toward the projection lens mount 9 and along the optical axis of the projection lens unit 7. The second cam follower 6 is inserted into the second cam hole 22b of the second lens shifting cam 22 and penetrates through the first cam follower guiding hole 20c of the first lens shifting cam 20 which surrounds the second cam hole 22b of the second lens shifting cam 22. The second cam follower 6 has a diameter which is substantially equal to the width of the first cam hole 22b. The second cam follower 6 is slightly shorter than the first cam follower 5 so that the second cam follower 6 does not strike a surface of the projection lens mount 9.

The flange 4 of the projection lens unit 7 further includes three screw through-holes 4a which are evenly spaced along the circumference of the flange 4. The projection lens unit 7 also includes three nuts 9b opposed to the respective screw through-holes 4a of the flange 4 in such a manner that each nut 9b is not rotated.

A screw 13 penetrates through each of the screw through-holes 4a provided in the flange 4 of the projection lens unit 7. A compression spring 11 and a collar 16 are fitted with each screw 13 in this order. The compression spring 11 is a cylinder-shaped coil spring. Each screw 13 penetrating the corresponding screw through-hole 4a is screw-joined with the corresponding nut 9a of the projection lens mount 7. Each screw 13 is biased in a direction leaving from the flange 4 by the compression spring 11. The compression spring 11 is not limited to the cylinder-shaped coil spring, but may be a cone-shaped coil spring. If using the cone-shaped coil spring, the compression spring 11 can be shortened when being compressed as compared to the cylinder-shaped coil spring.

In the thus-constructed optical unit 24, light emitted from a light source (not shown) is split into R, G, and B color light beams which are in turn brought to the respective liquid crystal panels 1R, 1G, and 1B. The light beams brought to the respective liquid crystal panels 1R, 1G, and 1B are modulated for each pixel in the respective liquid crystal panels 1R, 1G, and 1B based on image information. The modulated light beams are given to the color synthesizing prism 2. The color synthesizing prism 2 synthesizes the light beams which have passed through the respective liquid crystal panels 1R, 1G, and 1B to form image light. The image light produced by the color synthesizing prism 2 is emitted toward the center of the projection lens mount 9 and the projection lens unit 7 attached to the projection lens mount 9.

The projection lens unit 7 enlarges the image light emitted from the color synthesizing prism 2 and projects the enlarged light onto the mirror 25 provided in the cabinet 29 (FIG. 1). The image light projected on the mirror 25 is reflected by the mirror 25 to be projected onto the screen 3. In this manner, an image is produced on the screen 3.

When the lens shift mechanism provided in the optical unit 24 is used, each screw 13 is initially loosened so that the flange 4 of the projection lens unit 7 is slightly biased toward the projection lens mount 9 by the compression spring 11 fitted with each screw 13.

In this situation, the first lens shifting cam 20 is rotated by the operation portion 20d protruding from the flange 4 and the projection lens mount 9, in a direction indicated by the arrow A (FIG. 4), for example. Thereby, the first cam hole 20b of the first lens shifting cam 20 is rotated in the same direction. The first cam hole 20b is tilted with respect to the circumferential direction of the first lens shifting cam 20, so that as the first cam hole 20b is rotated in the direction indicated by the arrow A, the first cam follower 5 inserted in the first cam hole 20b is moved away from the center of the first lens cam 20.

The first cam follower 5 is inserted in the cam follower guiding hole 8 in such a manner as to be capable of sliding. The cam follower guiding hole 8 is extended along a radial direction of the first lens shifting cam 20 of the projection lens mount 9. As the cam hole 20b is rotated, the first cam follower 5 is guided by the cam follower guiding hole 8 to be moved in a radial direction indicated by an arrow Y shown in FIG. 4.

In this case, the second guiding hole 22c of the second lens shifting cam 22 opposed to the first cam hole 20b is unlikely to interfere with the movement of the first cam, follower 5 due to the rotation of the first cam hole 20b, since the second guiding hole 22c is designed to surround the whole first cam hole 20b.

Further, the second cam hole 22b of the second lens shifting cam 22 in which the second cam follower 6 is inserted, and the first cam hole 20a of the first lens shift cam 20 are arranged substantially along the movement direction of the first cam follower 5. Therefore, as the first cam follower 5 is moved in the direction indicated by the arrow Y, the second cam follower 6 is moved in the same direction without difficulty.

Thus, as the first lens shifting cam 20 is rotated, the first cam follower 5 is moved in a radial direction of the first lens shifting cam 20. In this case, the amount of the movement of the first cam follower 5 is smaller in the radial direction of the first lens shifting cam 20 than in the circumferential direction of the first lens shifting cam 20. Therefore, the first cam follower 5 can be precisely moved in the direction indicated by the arrow Y.

Figure 5:
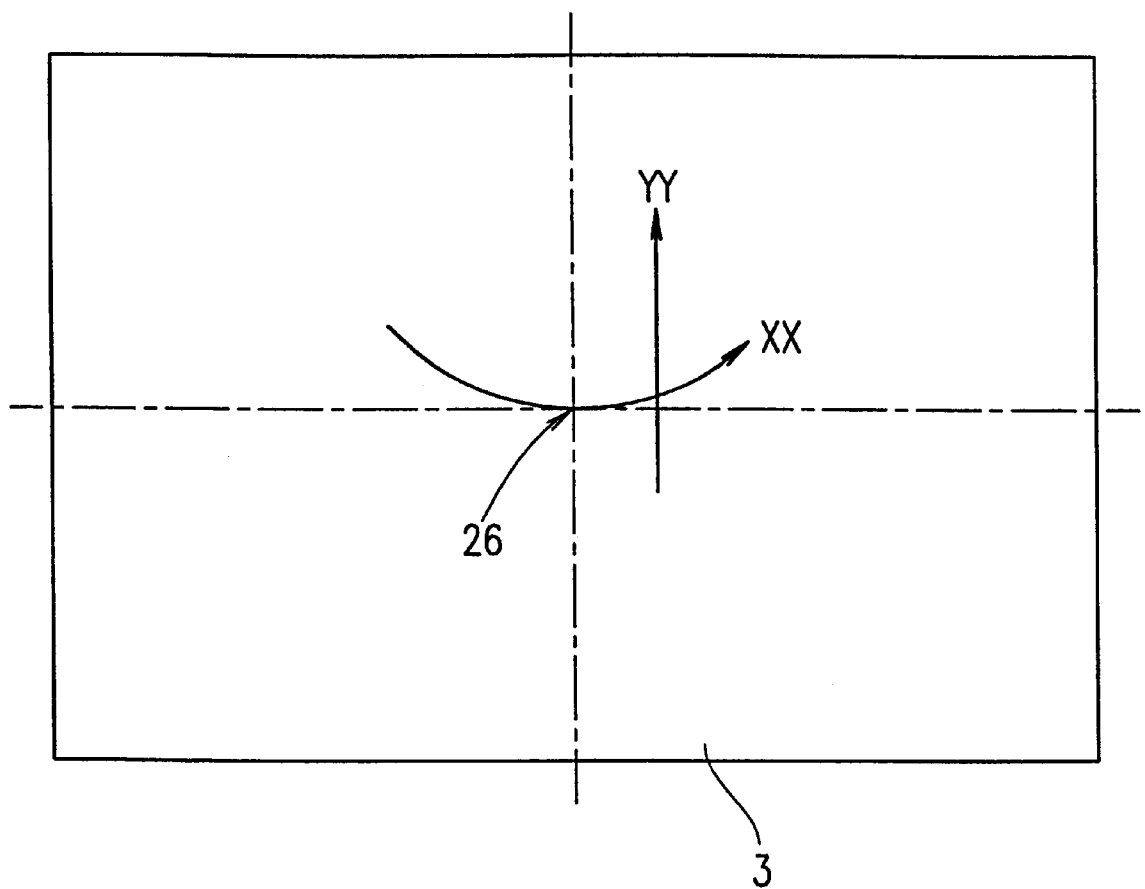
FIG. 5 is a schematic diagram for explaining thee position of an image displayed by the optical unit of FIG. 1.

As the first cam follower 5 is moved in the direction indicated by the arrow Y (FIG. 4), the flange 4 having the cam follower 5 attached thereto is also moved in the same direction and the projection lens unit 7 including the flange 4 is also moved in a radial direction perpendicular to the optical axis. The direction indicated by the arrow Y in FIG. 4 is a YY direction (vertical direction) in the screen 3 as shown in FIG. 5. Therefore, as the projection lens unit 7 is moved in the direction indicated by the arrow Y (FIG. 4), the center 26 of an image projected on the screen 3 is moved in a vertical direction of the image, i.e., the YY direction.

In this case, as described above, since the first cam follower 5 can be precisely moved in the direction indicated by the arrow Y, the position of an image projected on the screen 3 can be adjusted with respect to a vertical direction with high precision.

Further, when the first lens shifting cam 20 is rotated in a direction indicated by an arrow B shown in FIG. 4 by use of the operation portion 20d protruding from the flange 4 and the projection lens mount 9, the first cam follower 5 is similarly moved in a direction opposite to the direction indicated by the arrow Y. Therefore, the projection lens unit 7 is translated in the opposite direction to the arrow Y, and a center 26 of an image projected on the screen 3 is moved in a vertical direction opposite a YY direction shown in FIG. 5.

When the second lens shifting cam 22 is rotated in a direction indicated by an arrow C shown in FIG. 4 by use of the operation portion 22d protruding from the flange 4 and the projection lens mount 9, the second cam hole 22b of the second lens shifting cam 22 is moved in the same direction. The second cam hole 22b is tilted with respect to the circumferential direction of the second lens shifting cam 22. As the second cam hole 22b is rotated in the direction indicated by the arrow C, the second cam follower 6 inserted in the second cam hole 22b is moved in a direction toward the center of the second lens shifting cam 22.

In this case, the first cam follower 5 attached to the flange 4 of the projection lens unit 7 is inserted in the cam follower guiding hole 8 extending along a radial direction of the first lens shifting cam 20 attached to the projection lens mount 9, the cam follower 5 is not moved in a direction perpendicular to the lengthwise direction of the cam follower guiding hole 8. Therefore, the second cam follower 6 is moved toward the center of the second lens shifting cam 22 along a circumference around the cam follower 5. As shown by the arrow X in FIG. 4, the second cam follower 6 is moved toward the center of the second lens shifting cam 22 along a circle whose center is the first cam follower 5.

When the second cam follower 6 is moved along an arc as indicated by an arrow X show in FIG. 4, the flange 4 having the second cam follower 5 attached thereto; is also moved in the same direction and the projection lens unit 7 including the flange 4 is also moved in the same direction. The direction indicated by the arrow X in FIG. 4 corresponds to an arc-shaped XX direction, which is substantially along the horizontal direction, on the screen 3. The center 26 of an image projected on the screen 3 is moved along the XX direction.

In this case, since the first guiding hole 20a of the first lens shifting cam 20 provided in substantially the same position as that of the second cam hole 22b has such a size as to surround the whole second cam hole 22b, the first guiding hole 20c is unlikely to interfere with the movement of the second cam follower 5 due to the rotation of the second cam hole 22b.

As the second lens shifting cam 22 is rotated, the second cam follower 6 is moved substantially along a radial direction of the second lens shifting cam 22. The amount of movement of the second cam follower 6 is smaller than the amount of rotation of the second lens shifting cam 22. Therefore, the second cam follower 6 can be precisely moved in the direction indicated by the arrow X. As a result, the center of an image projected on the screen 3 can be adjusted with respect to the horizontal direction with high precision.

Thus, the position of an image projected on the screen 3 is adjusted by adjusting the position of the projection lens unit 7. Once the position of an image projected on the screen 3 is adjusted, each screw 13 is fastened. Therefore, the projection lens unit 7 is positioned and fixed with respect to the projection lens mount 9 while keeping the adjusted state.

It should be noted that in the above-described embodiment, the first and second lens shifting cams 20 and 22 are in the shape of a ring which are rotated around the optical axis of the projection lens unit 7. Further, the first and second lens shifting cams 20 and 22 are attached to the projection lens mount 9 in such a manner as to be capable of being rotated. The present invention is not limited to such a configuration. The first lens shifting cam 20 may be moved with respect to the projection lens mount 9 in such a manner that the first cam follower 5 can be moved along the cam follower guiding hole 8. Similarly, the second lens shifting cam 22 may be moved with respect to the projection lens mount 9 in such a manner that the second cam follower 6 can be moved in a predetermined direction. For example, the first and second lens shifting cams 20 and 22 may be moved in a straight line direction with respect to the projection lens mount 9. Furthermore, the first and second lens shifting cams 20 and 22 may be capable of being rotated with respect the projection lens mount 9 around a center of rotation which is away from the vicinity of the optical axis of the projection lens unit 7.

Figure 6:
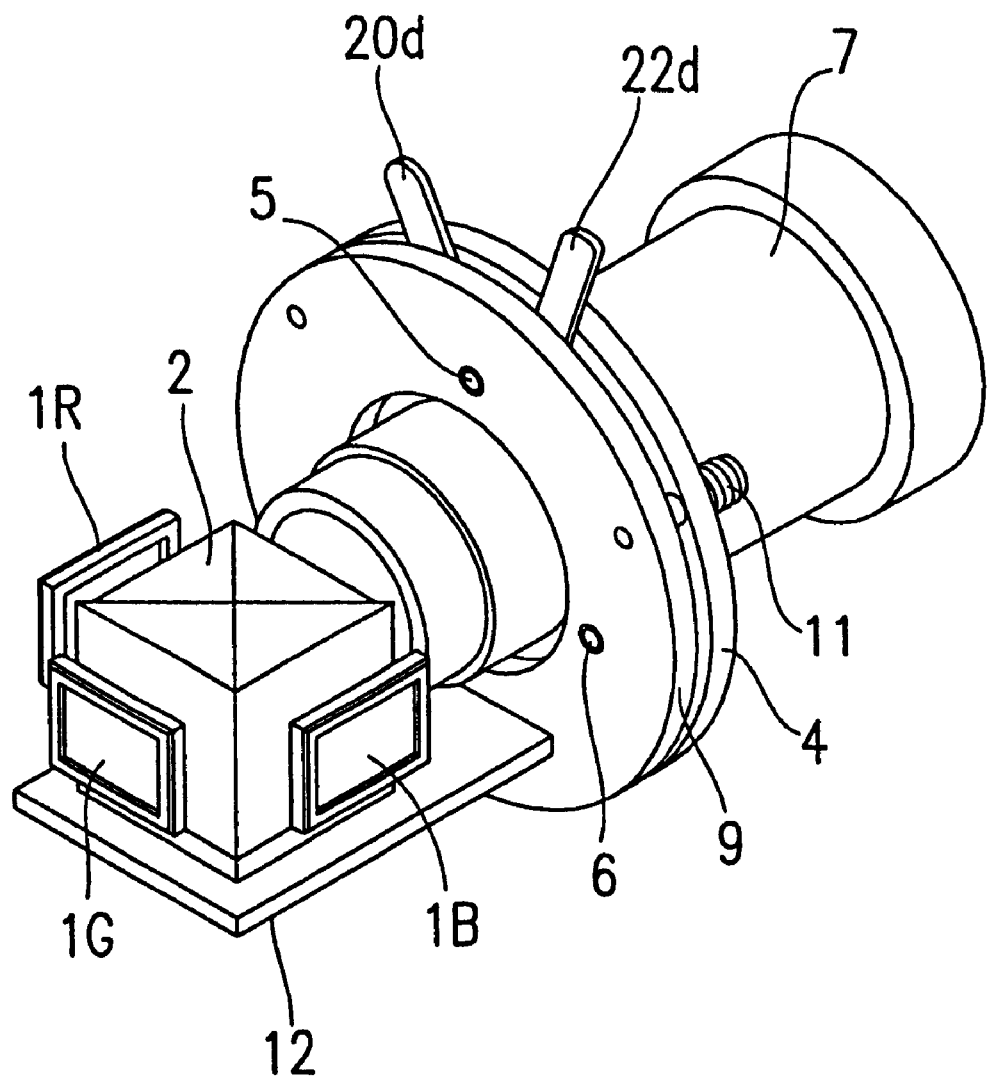
FIG. 6 is a perspective view showing another exemplary optical unit including a lens shifting mechanism according to the present invention.
Figure 7:
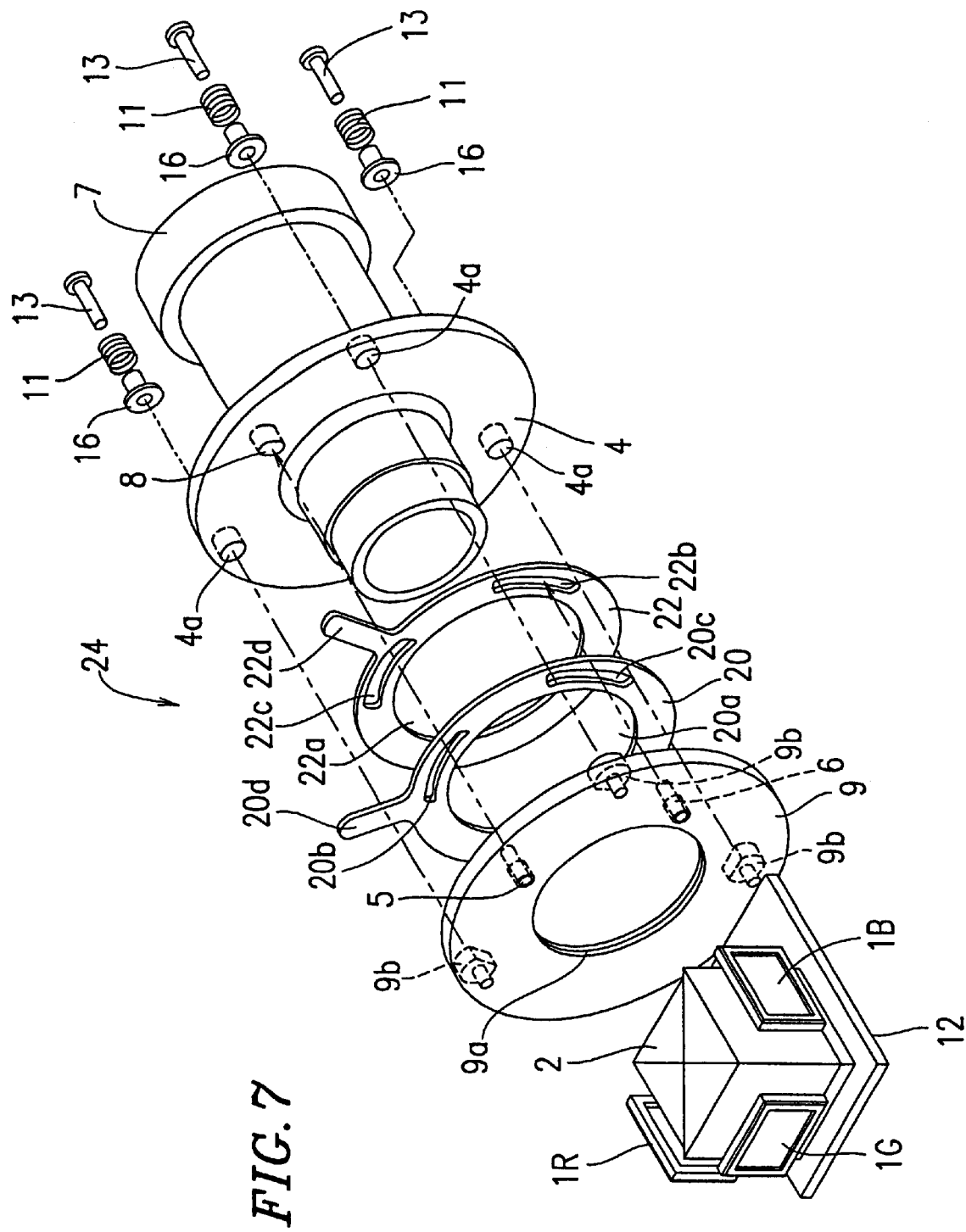
FIG. 7 is an exploded perspective view of the optical unit of FIG. 6.

Although the first and second cam followers 5 and 6 are attached to the flange 4 integrated with the projection lens unit 7, the first and second cam followers 5 and 6 may be provided in the projection lens mount 9 as shown in FIGS. 6 and 7, and the cam follower guiding hole 8 for guiding the inserted first cam follower 5 along a radial direction of the projection lens mount 9 may be provided in the flange 4 integrated with the projection lens unit 7.

In this case, the first cam follower 5 is moved in a radial direction along the cam follower guiding hole 8 by rotating the first lens shifting cam 20. Thereby, the projection lens mount 9 having the first cam follower 5 attached thereto is moved with respect to the flange 4 integrated with the projection lens unit 7. Similarly, the second cam follower 6 is moved by rotating the second lens shifting cam 22, whereby the projection lens mount 9 having the second cam follower 6 is moved with respect to the flange 4 integrated with the projection lens unit 7.

Further, although a transmission type liquid crystal panel is used as a light valve in the above-described embodiment, a reflection type light valve, such as a reflection type liquid crystal display panel and a digital micromirror device (DMD: trade name), may be employed.

The lens shifting mechanism of the present invention has a simple configuration in which an increase in a parts count is minimized. In the lens shifting mechanism of the present invention, a projection lens unit can be fine tuned in one or two directions. As a result, the position of an image projected from the projection lens unit can be fine tuned.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A projection lens shifting mechanism, comprising:

a projection lens unit in the shape of a cylinder for projecting incoming image light:

a flange integrated with the projection lens unit;

a projection lens mount for providing light emitted from a light valve in the shape of a plane to the projection lens unit, wherein the light valve can be optically modulated for each pixel based on image information, and the projection lens mount is concentric to an optical axis of the light emitted from the light valve;

a first cam follower provided in the flange along an optical axis of the projection lens unit;

a cam follower guiding portion provided in the projection lens mount for guiding the first cam follower in a direction perpendicular to the optical axis of the projection lens unit;

a first lens shifting cam capable of being moved in a predetermined direction with respect to the projection lens mount and engaged with the first cam follower, for shifting the first cam follower in a direction guided by the cam follower guiding portion when the first lens shifting cam is moved in the predetermined direction; and a fixing section for integrating and fixing the first lens shifting cam and the flange to the projection lens mount.

2. A projection lens shifting mechanism according to claim 1, wherein the first lens shifting cam is in the shape of a ring, and is attached to the projection lens mount in such a manner as to be capable of being rotated around light emitted from the light valve.

3. A projection lens shifting mechanism according to claim 2, wherein the first lens shifting cam includes a cam hole extending in a direction tilted with respect to a circumferential direction of the first lens shifting cam, and the first cam follower is engaged with the cam hole.

4. A projection lens shifting mechanism according to claim 1, wherein the first lens shifting cam is provided between the flange and the projection lens mount, and the fixing section includes a screw and a nut to integrate the flange with the projection lens mount.

5. A projection lens shifting mechanism according to claim 4, wherein the screw is provided with a compression spring so that the flange is biased toward the projection lens mount.

6. A projection lens shifting mechanism according to claim 1, wherein:

the flange includes a second cam follower provided about ¼ of a perimeter in a circumferential direction of the flange away from the first cam follower and along the optical axis of the projection lens unit;

second lens shifting cam engaged with the second cam follower is attached to the projection lens mount in such a manner as to be capable of being moved in a predetermined direction; and the second cam follower is moved in a direction substantially perpendicular to the cam follower guiding portion when the second lens shifting cam is moved in the predetermined direction with respect to the projection lens mount.

7. A projection lens shifting mechanism according to claim 6, wherein the second lens shifting cam is in the shape of a ring, and is attached to the projection lens mount in such a manner as to be capable of being rotated around light emitted from the light valve.

8. A projection lens shifting mechanism according to claim 7, wherein the second lens shifting cam includes a cam hole extending in a direction tilted with respect to a circumferential direction of the second lens shifting cam, and the second cam follower is engaged with the cam hole.

9. A projection lens shifting mechanism according to claim 6, wherein the second lens shifting cam and the flange are integrated and fixed to the projection lens mount by the fixing section.

10. A projection lens shifting mechanism according to claim 1, wherein the light valve is of a transmission type where light is transmitted through the light valve, or of a reflection type where light is reflected by the light valve.

11. A rear projection television, comprising a projection lens shifting mechanism according to claim 1.

12. A projection lens shifting mechanism, comprising:

a projection lens unit in the shape of a cylinder for projecting incoming image light;

a flange integrated with the projection lens unit;

a projection lens mount for providing light emitted from a light valve in the shape of a plane to the projection lens unit, wherein the light valve can be optically modulated for each pixel based on image information, and the projection lens mount is concentric to an optical axis of the light emitted from the light valve:

a first cam follower provided in the projection lens mount along an optical axis of the projection lens unit;

a cam follower guiding portion provided in the flange for guiding the first cam follower in a direction perpendicular to the optical axis of the projection lens unit;

a first lens shifting cam capable of being moved in a predetermined direction with respect to the projection lens mount and engaged with the first cam follower, for shifting the first cam follower in a direction guided by the cam follower guiding portion when the first lens shifting cam is moved in the predetermined direction; and a fixing section for integrating and fixing the first lens shifting cam and the flange to the projection lens mount.

13. A projection lens shifting mechanism according to claim 12, wherein:

the flange includes a second cam follower provided about ¼ of a perimeter in a circumferential direction of the flange away from the first cam follower and along the optical axis of the projection lens unit;

a second lens shifting cam engaged with the second cam follower is attached to the projection lens mount in such a manner as to be capable of being moved in a predetermined direction; and the second cam follower is moved in a direction substantially perpendicular to the cam follower guiding portion when the second lens shifting cam is moved in the predetermined direction with respect to the projection lens mount.

14. A rear projection television, comprising a projection lens shifting mechanism according to claim 12.

* * * * *